US011891011B1

United States Patent
Rashinkar et al.

(10) Patent No.: US 11,891,011 B1
(45) Date of Patent: Feb. 6, 2024

(54) AIRBAG TEAR SEAM

(71) Applicant: Faurecia Interior Systems, Inc., Auburn Hills, MI (US)

(72) Inventors: Prashant Rashinkar, Rochester Hills, MI (US); Ashish Bhise, Pune (IN); Sangamesh Adaki, Pune (IN); Rahul Mat, Pune (IN); Satish Rapelli, Pune (IN); Gautam Kamble, Pune (IN)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/950,315

(22) Filed: Sep. 22, 2022

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
CPC .. B60R 21/2165; B60R 21/205; B60R 21/215
See application file for complete search history.

(56) References Cited

U.S. PATENT DOCUMENTS

| 6,089,642 | A | 7/2000 | Davis, Jr. et al. | |
|---|---|---|---|---|
| 9,321,419 | B2 * | 4/2016 | Kwasnik | B60R 21/205 |
| 2021/0101555 | A1 * | 4/2021 | Schorn | B60R 21/205 |
| 2022/0234536 | A1 * | 7/2022 | Oh | B60R 21/2165 |

FOREIGN PATENT DOCUMENTS

| CN | 109774645 | A | * | 5/2019 | ........... | B60R 21/205 |
|---|---|---|---|---|---|---|
| DE | 19958865 | A1 | * | 6/2001 | ......... | B29C 45/0081 |
| DE | 102015008940 | A1 | * | 3/2016 | ......... | B60R 21/2165 |
| DE | 102015008940 | A1 | | 3/2016 | | |
| EP | 2284048 | B1 | | 2/2011 | | |
| EP | 2353947 | B1 | | 8/2011 | | |
| KR | 100805453 | B1 | * | 2/2008 | ........... | B60R 21/205 |
| KR | 100805453 | B1 | | 2/2008 | | |

OTHER PUBLICATIONS

Guengoer, Mar. 2016, DE-102015008940-A1, Machine Translation of Specification.*
Segura, Jun. 2001, DE-19958865-A1, Machine Translation of Specification.*
Kwasnik, May 2019, CN-109774645-A, Machine Translation of Specification.*
Lee, Feb. 2008, KR-100805453-B1, Machine Translation of Specification.*

* cited by examiner

*Primary Examiner* — Paul N Dickson
*Assistant Examiner* — Matthew Joseph Ganci
(74) *Attorney, Agent, or Firm* — Reising Ethington P.C.

(57) ABSTRACT

A vehicle interior panel is configured to split along a tear seam during airbag deployment. The tear seam has an unconventional shape with one or more segments forming an oblique angle with other segments. The tear seam shape is useful to further enhance the safety of vehicle passengers and to provide unobstructed pivoting of one or more airbag doors formed during airbag deployment. The panel can also be structured to ensure that the airbag forces used to split the tear seam are properly directed to enhance tear seam function.

20 Claims, 2 Drawing Sheets

AIRBAG TEAR SEAM

TECHNICAL FIELD

The present disclosure is related generally to vehicle interiors and, more particularly, to vehicle interior panels for use over an airbag.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where the deployment opening is formed during airbag deployment, a tear seam may be provided in one or more components of the panel to control the location of material separation during the deployment.

U.S. Pat. No. 6,089,642 to Davis et al. discloses typical tear seam shapes. In each embodiment described in the Davis patent, rectangular airbag doors are concealed beneath a layer of material having a tear seam formed along its underside. In one example, the tear seam is U-shaped and is located along the three unhinged sides of the airbag door. In another example, the tear seam is H-shaped with the vertical bars of the H-shape following side edges of a pair of opposing airbag doors and the crossbar of the H-shape following the adjacent edges of the pair of airbag doors.

SUMMARY

In accordance with various embodiments, a vehicle interior panel includes a tear seam, and the panel is configured to split along the tear seam during airbag deployment. The tear seam includes first, second, third, and fourth segments. The second segment is parallel with the first segment. The third segment extends from the first segment toward the second segment and forming a first angle with the first segment. The fourth segment extends from the second segment toward the first segment and forms a second angle with the second segment. The second angle is different from the first angle.

In various embodiments, the third segment and the fourth segment intersect.

In various embodiments, an end of the third segment and an end of the fourth segment are located in a central section of a door region that includes the tear seam. The central section is centered between the first segment and the second segment and has a width that is 50% or less of a distance between the first segment and the second segment. The third segment and the fourth segment may intersect in the central section. The width of the central section may have a width that is 10% or less of the distance between the first segment and the second segment.

In various embodiments, a difference between the first angle and the second angle is in a range from 5 degrees to 30 degrees.

In various embodiments, a door is formed from the panel when the panel splits along the tear seam during airbag deployment, the door pivots about a hinge, and the third segment is parallel with the hinge.

In various embodiments, a first door and a second door are formed from the panel when the panel splits along the tear seam during airbag deployment, and an area of the first door is larger than an area of the second door.

In various embodiments, a first door and a second door are formed from the panel when the panel splits along the tear seam during airbag deployment, the first door pivots about a first hinge, the second door pivots about a second hinge, and a distance between the third segment and the first hinge is greater than 60% of a distance between the first hinge and the second hinge.

In various embodiments, the vehicle interior panel is an instrument panel, and the tear seam is on a passenger side of a vehicle when the panel is installed in the vehicle. A first door and a second door may be formed from the panel when the panel splits along the tear seam during airbag deployment such that a larger of the first door and the second door pivots toward a windshield of the vehicle, and a smaller of the first door and the second door pivots away from the windshield. The first door may provide clearance with an A-pillar of the vehicle.

In various embodiments, the vehicle interior panel also includes a rib structure extending along an inner side of the panel and adjacent to the third segment or the fourth segment of the tear seam such that a door region of the panel has a maximum stiffness along the tear seam. A maximum height of the rib structure may be along the third segment or the fourth segment of the tear seam. The rib structure may include a plurality of ribs extending away from the third segment or the fourth segment and parallel with the first segment and the second segment. Each rib may have a height that decreases with a distance from the third segment or the fourth segment of the tear seam.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel configured to split along a tear seam during airbag deployment. The tear seam has an unconventional shape with one or more segments forming oblique angles with other segments. The tear seam shape is useful to further enhance the safety of vehicle passengers and to provide unobstructed pivoting of one or more airbag doors formed during airbag deployment. The panel can also be structured to ensure that the airbag forces used to split the tear seam are properly directed to enhance tear seam function.

Figure 1:
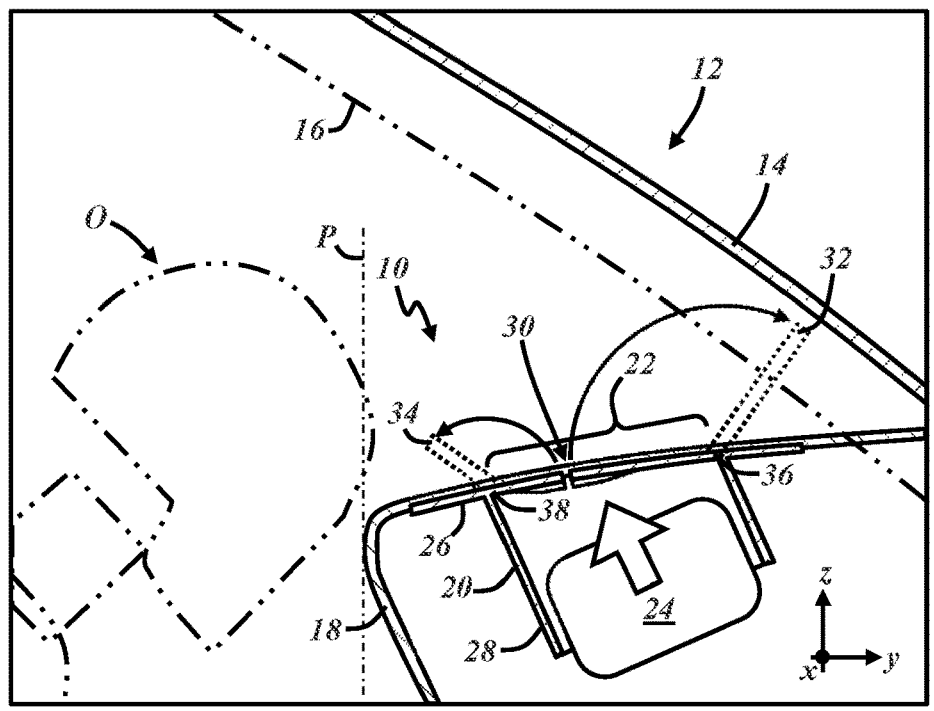
FIG. 1 is a schematic cross-sectional view of an embodiment of a vehicle interior panel installed in a vehicle.

FIG. 1 is a schematic cross-sectional view of an embodiment of a vehicle interior panel 10 installed in a vehicle 12. In this example, the interior panel 10 is an instrument panel of the type that is installed along the front of the vehicle passenger cabin adjacent to a windshield 14 of the vehicle 12 and extending transversely across at least a portion of the passenger cabin from an A-pillar 16 of the vehicle (shown in phantom). The illustrated panel 10 includes a main body 18 and an airbag module 20 affixed to an inner surface of the main body at a through-opening.

While not illustrated in detail here, vehicle panels such as the illustrated instrument panel 10 may typically include a rigid substrate (e.g., a reinforced polymer) providing the overall shape and structure of the panel and a decorative covering (e.g., leather or a foam-backed polymer film) overlying the rigid substrate to provide the desired vehicle interior aesthetic. In the construction of FIG. 1, a door region 22 of the airbag module 20 is exposed to the inner side of the decorative covering through an opening in the rigid substrate. Other constructions are possible, such as a drop-in airbag module or an interior panel having the door region integrally molded as part of the rigid substrate. The tear seam shapes disclosed below are also useful in other vehicle interior panels that conceal airbags, such as steering wheel panels, door panels, pillar trim panels, or seat panels and may alternatively or additionally be formed in one or more decorative covering layers.

The airbag module 20 is configured to house an inflatable airbag 24 and includes a deployment panel 26 and a chute 28 extending from an inner side of the deployment panel. The deployment panel 26 includes the door region 22 and a tear seam 30. The chute 28 guides the inflating airbag 24 toward the deployment panel 26 and tear seam 30. The airbag module 20 may be located on the passenger side of the vehicle in which the panel 10 is installed.

The vehicle interior panel 10 is configured to split along the tear seam 30 during airbag deployment so that the airbag 24 can deploy through the panel and into the vehicle passenger cabin when triggered to activate and inflate. One or more doors are formed from the panel 10 when the panel splits along the tear seam 30. In the illustrated example, a first door 32 and a second door 34 are formed. The first door 32 pivots about a first hinge 36, and the second door 34 pivots about a second hinge 38. The ordinal numbers used herein are arbitrary and are not limited to any particular door, hinge, or tear seam segment depicted in the drawings.

The tear seam 30 can be configured so that one of the doors is larger than the other door. In this case, the first door 32 that pivots toward the windshield 14 is larger than the second door 34 that pivots away from the windshield. The second door 34 opens toward a vehicle occupant O in the passenger cabin. The second door 34 is formed so that an edge of the door opposite the hinge 38 does not extend beyond a rearmost extent (vertical plane P in FIG. 1) of the instrument panel 10 when fully open. The door 34 that pivots away from the windshield 14 may be sized and shaped so that a minimum distance between the door 34 and the vertical plane P is greater than 20 mm. This construction can, for example, prevent an out-of-position occupant O from contacting the airbag door 34, which may have a rougher edge than the decorative covering of the panel 10 at the plane P.

The first door 32 is considered larger than the second door 34 if the first door has an area, a perimeter, or an edge-to-edge dimension greater than that of the second door. The dimension is a dimension measured perpendicular to the respective hinge 36, 38. In some cases, the area, perimeter, or dimension of one door is at least 10% greater than that of the other door. In some cases, the area, perimeter, or dimension of one door is at least 20% greater than that of the other door.

Forming one door larger than the other door poses several challenges not encountered with conventional rectangular airbag doors. For example, the smaller one door is, the larger the other door must be for any given size of deployment opening. When the second door 34 is formed to be smaller than the first door 32, the first door may have an excessive length that could interfere with the windshield 14 or A-pillar 16.

Figure 2:
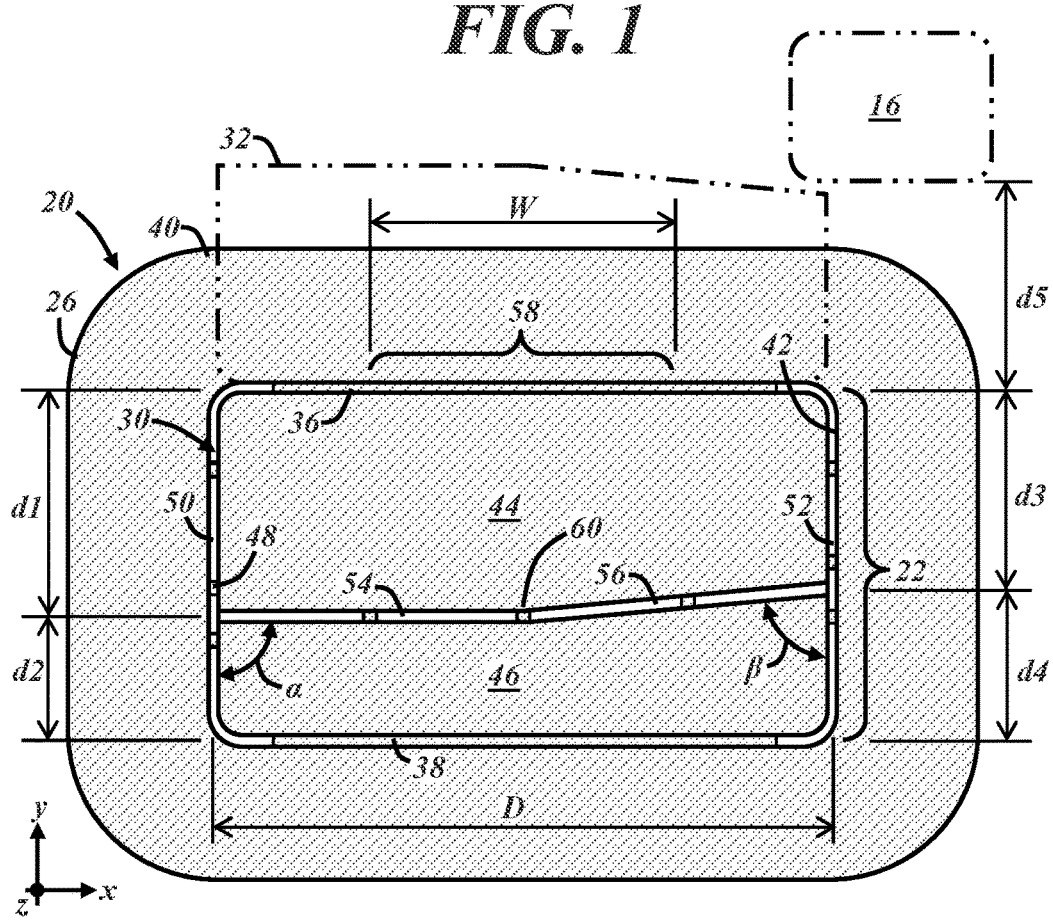
FIG. 2 is a top view of an airbag module of the vehicle interior panel of FIG. 1.

FIG. 2 is a top view of the airbag module 20 of FIG. 1 with the main body 18 of the panel 10 omitted. The shaded portions of FIG. 2 represent solid material (e.g., plastic), and the unshaded portion represent gaps between portions of solid material. The deployment panel 26 includes a frame 40 that defines a deployment opening 42 surrounding the door region 22. The tear seam 30 defines the locations of the panel 10 along which the panel splits during airbag deployment and partly defines the boundary between the frame 40 and the door region 22. The hinges 36, 38 are illustrated as simple material bridges in FIG. 2 but may include other features, such as an S- or U-shape in the y-z plane, additional gaps, and/or hinge reinforcements.

In the illustrated example, the tear seam 30 is defined in part by a gap between the frame 40 and first and second portions 44, 46 of the door region 22, which become the first and second doors 32, 34 pivoting about first and second hinges 36, 38 during airbag deployment. The formed doors 32, 34 may additionally include one or more panel layers overlying the first and second portions 44, 46 of the door region 22. Relatively small material bridges 48 along the perimeter of each portion 44, 46 of the door region 22 connect the door region to the frame 40 and the door region portions 44, 46 to each other. The material bridges 48 maintain the planar position of the door region portions 44, 46 relative to the frame 40 and to the main body 18 of the panel 10 prior to airbag deployment and are designed to break to form the doors 32, 34 during airbag deployment. Other types of tear seams are possible, such as a laser score line or other line of weakening along the deployment panel 26 or along the substrate of the main body 18. The illustrated tear seam 30 and/or a differently shaped tear seam may be formed in overlying layers, such as the decorative covering of the main body.

The tear seam 30 has a modified H-shape composed of multiple segments. The segments of the illustrated tear seam 30 include a first segment 50, a second segment 52, a third segment 54, and a fourth segment 56. As used herein, a segment is any distinct line connecting two points in the x-y plane, including rectilinear or curvilinear lines. Lines are distinct when they do not intersect or when they intersect at a non-tangent point—i.e., at the intersection of two rectilinear lines at different angles, or at the non-tangent intersection of a curvilinear line with any other line. For purposes of tear seam shapes, rounded corners connecting two rectilinear sides of an airbag door are ignored and treated as sharp corners. Segments are parallel segments when equally spaced from each other in the x-y plane along their entire length. Segments are separate from each other if they do not intersect each other.

The first segment 50 and the second segment 52 are separate and parallel segments extending in a longitudinal (y) direction and spaced apart in a transverse direction (x), representing the "uprights" of the H-shape. In this case, the first and second segments 50, 52 are perpendicular with the hinges 36, 38. The "crossbar" of the H-shape includes the third segment 54 and the fourth segment 56, which together span the full width of the tear seam 30 as measured in the direction (x) along which the hinges 36, 38 extend.

Each of the third and fourth segments 54, 56 extends from a different one of the first and second segments 50, 52. Here, the third segment 54 extends from the first segment 50 toward the second segment 52 and forms a first angle α with the first segment. The fourth segment 56 extends from the second segment 52 toward the first segment 50 and forms a second angle β with the second segment. Each of the third and fourth segments 54, 56 also extends in a direction that intersects the respective second and first segments 52, 50.

The first and second angles α, β are different from each other. Each angle is defined as the smallest angle formed between the respective directions of the intersecting segments. In this example, the first segment 50 is perpendicular with the third segment 54 (α=90°), while the second segment 52 forms an acute angle (β<90°) and is diagonal or oblique with respect to the fourth segment 56. The illustrated angle β between the second and fourth segments 52, 56 is 85 degrees, and the difference between the first and second angles is 5 degrees. In other embodiments, the difference between the first and second angles is in a range from 5 degrees to 45 degrees. In yet other embodiments, the difference between the first and second angles is in a range from 10 degrees to 30 degrees, from 15 degrees to 25 degrees, from 5 degrees to 30 degrees, from 5 degrees to 20 degrees, or from 5 degrees to 10 degrees.

In some embodiments, the third and fourth segments 54, 56 intersect as shown in FIG. 2. In other embodiments, the third and fourth segments do not intersect each other and may intersect one or more other segments. Each of the third and fourth segments 54, 56 may have an end in a central section 58 of the door region 22. The central section 58 is a section that is equally spaced from the first and second segments 50, 52 and has a width W that is less than a distance D between the first and second segments. The width W of the central section 58 may be 50% or less of the distance between the first and second segments, as shown in FIG. 2. The central section 58 may have a width in a range from 1% to 75% or from 5% to 50% of the distance D. In the illustrated embodiment, each of the third and fourth segments 54, 56 has an end at the same point 60 within the door region 22 and the tear seam 30. Here, the point 60 is the intersection point of the third and fourth segments and is midway between the first and second segments 50, 52, lying in the central 10% of the space between the first and second segments.

As noted above, one of the doors 32, 34 may be formed larger than the other. In this case, all three of the area, perimeter, and an edge-to-edge dimension of the first portion 44 are greater than those of the second portion 46 of the door region 22. In the illustrated example, the area of the first portion 44 is over 60% of the total area of the door region and about 70% greater than the area of the second portion 46. The first portion 44 has a perimeter in a range from 5% to 10% greater than the perimeter of the second portion 46.

A dimension d1 of the first portion 44 of the door region 22 between the first hinge 36 and the third segment 54 of the tear seam 30 is about 65% of the distance between the first and second hinges 36, 38 and about 30% greater than a dimension d2 of the second portion 46 of the door region between the second hinge 38 and the third segment of the tear seam. The dimensions d1, d2 relative to the distance between the hinges 36, 38 may be expressed as a split percentage. The illustrated example employs a 65-35 split between the respective first and second doors 32, 34 formed during airbag deployment. In other examples, the door region 22 is configured with a 60-40 split, a 70-30 split, or an 80-20 split, where the percentages represent ranges including ±5%. These split percentages may apply to the dimensions d1, d2 or the areas of the respective portions 44, 46 of the door region 22.

Along the second segment 52 of the tear seam 30, a dimension d3 of the first portion 44 of the door region 22 is about 55% of the distance between the first and second hinges 36, 38 and about 20-25% greater than a dimension d4 of the second portion 46 of the door region. The distance between the first hinge 36 and the third and fourth segments 54, 56 of the tear seam 30 is greater than the distance between the second hinge 38 and the third and fourth segments of the tear seam along the entire width D of the tear seam.

As noted above, forming the first door 32 larger than the second door can lead to problems not encountered with conventional symmetric airbag doors, such as equally sized rectangular doors. The A-pillar 16 of the vehicle in which the panel 10 is installed is illustrated in phantom where the pillar intersects the panel 10. As is evident in FIG. 2, if the first and second portions 44, 46 of the door region 22 were divided by a single segment parallel with the hinges 36, 38, the A-pillar 16 would interfere with the first door 32 during airbag deployment. In the illustrated embodiment, the first door 32 provides clearance with the A-pillar 16 during airbag deployment. This is effected by tuning the angle β between the second and fourth segments 52, 56 of the tear seam. The angle β may be made sufficiently small for the first door 32 to clear the A-pillar 16 during airbag deployment. While the clearance between the first door 32 and the pillar 16 is illustrated with the door fully open flat against the top surface of the surrounding instrument panel, the clearance may be provided along the entire pivoting path of the first door. The required angle β may thus be a function of the rake angle of the windshield 14 and pillar 16.

Another potential problem with an H-shaped tear seam having the "crossbar" not centered between the hinges of the airbag doors is with airbag force distribution. The point of first contact of the inflating airbag with the inner side of the interior panel 10 and/or deployment panel 26 may typically be at a point central to the deployment opening—i.e., equally spaced from the hinges and equally spaced from the first and second segments of the tear seam. Where the first and second portions 44, 46 of the door region 22 are not equally divided between the first and second hinges 36, 38 as in FIG. 2, the natural point of first contact does not lie along the tear seam 30; rather, it is spaced from the tear seam, thus applying the first tear-inducing forces from the airbag at a location away from the intending panel-splitting location. This may cause an unwanted delay in the initiation of the splitting of the panel 10 along the tear seam. On the time-scale of airbag deployments, a few milliseconds can make the difference between a properly deployed airbag and an improperly deployed one.

Figure 3:
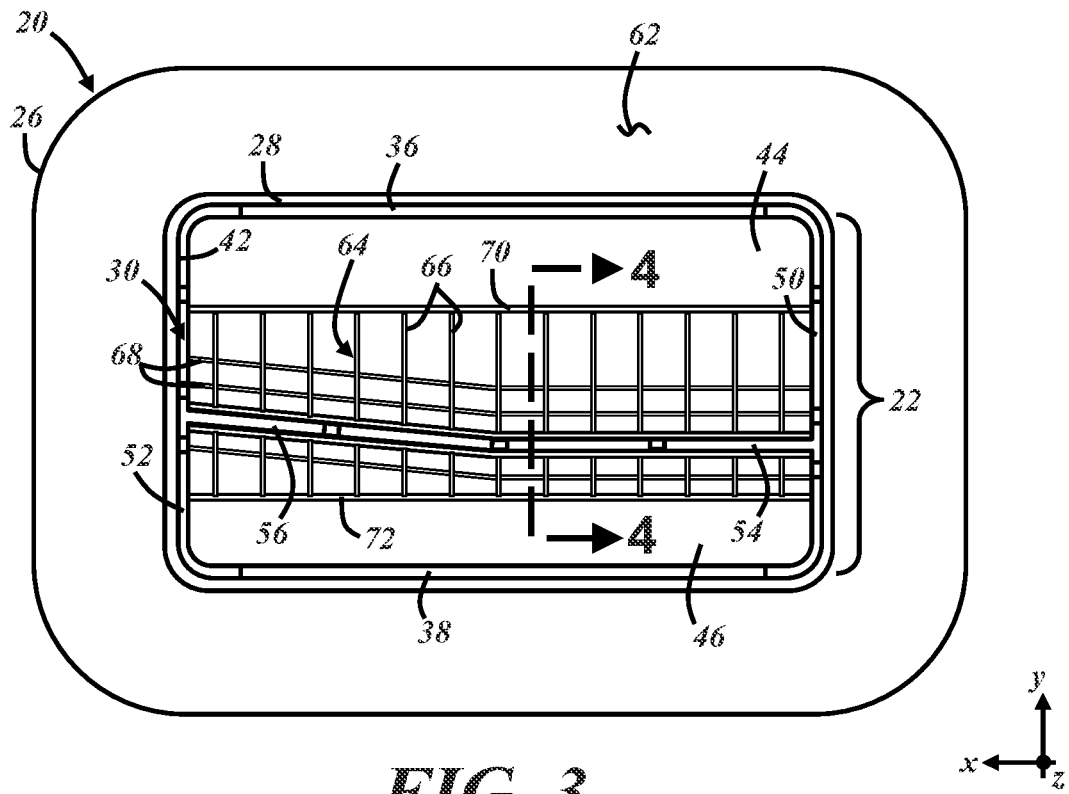
FIG. 3 is a bottom view of the airbag module of FIG. 2 illustrating a rib structure.

The illustrated airbag module 20 and, thereby, the illustrated panel 10 may include measures to direct initially encountered airbag inflation forces away from the natural point of first contact and toward the tear seam 30. FIG. 3 is a bottom view of the airbag module 20 of FIGS. 1 and 2 with the inflatable airbag 24 omitted. Visible in this view are an inner side 62 of the deployment panel 26, the tubular chute 28 surrounding and at least partially defining the deployment opening 42, and a rib structure 64 located along the inner side of the deployment panel. The rib structure 64 is located within the door region 22 and has respective portions on each of the first and second portions 44, 46 of the door region.

The illustrated rib structure 64 is unconventional at least because rib structures are not typically employed along the inner side of a panel configured for use over an airbag. The rib structure 64 is configured in a manner that locates a maximum stiffness of the door region 22 along the "crossbar" of the H-shape of the tear seam 30—that is, adjacent to the third and/or fourth segments 54, 56 of the tear seam. The maximum stiffness is in bending, particularly in a y-z plane about an x-axis and, to some degree, in an x-z plane about a y-axis. Stated differently, the referenced stiffness is a resistance to bending the door region 22 of the panel out-of-plane.

The rib structure 64 includes a plurality of ribs in a grid-like pattern, including longitudinally extending ribs 66 and transversely extending ribs 68. The longitudinal ribs 66 each extend in a direction (y) perpendicular with the first and second hinges 36, 38 and parallel with the first and second segments 50, 52 of the tear seam 30. The transverse ribs 68 each extend in a direction parallel with the third and fourth segments 54, 56 of the tear seam 30. The rib 64 structure is bounded on two sides by the first and second segments 50, 52 of the tear seam 30 and on another two sides by transversely extending boundary ribs 70, 72.

Figure 4:
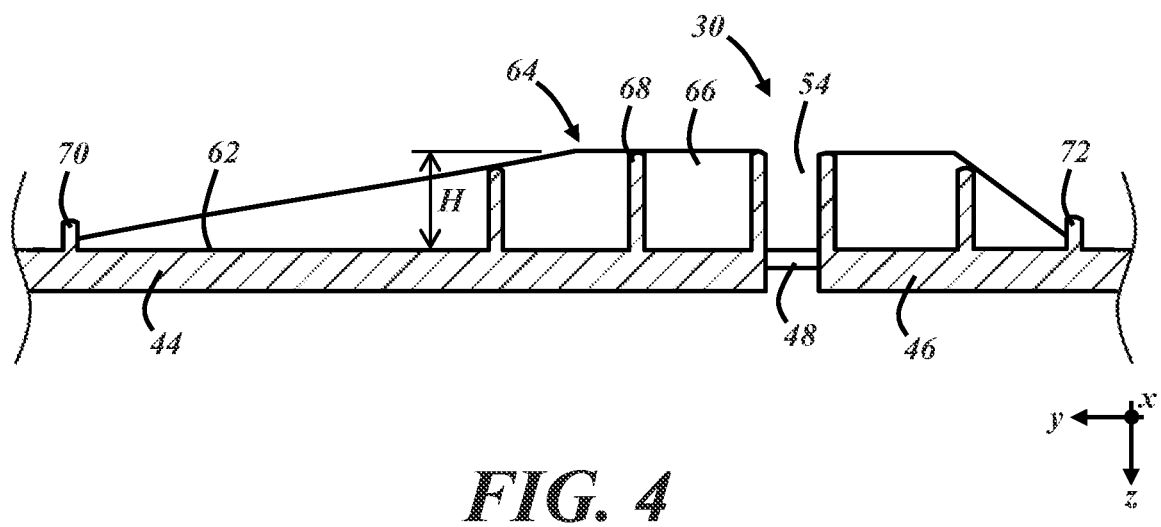
FIG. 4 is an enlarged cross-sectional view of a portion of the rib structure of FIG. 3.

The above-noted maximum stiffness of the door region 22 is provided at the location of a maximum height H of the rib structure 64 and its ribs 66, 68 as illustrated in the cross-sectional view of FIG. 4. The maximum height H of the rib structure 64 is along the third and fourth segments 54, 56 of the tear seam 30—i.e., at the intended location of the splitting of the panel. This makes the effective thickness of the first and second portions 44, 46 of the door region highest along the tear seam 30. The effects of locating the maximum height H of the rib structure 64 as in the figures are at least twofold. One effect is to alter the natural point of first contact of the inflating airbag to be closer to the tear seam 30. In other words, the rib structure 64 extends from the inner side 62 of the deployment panel 26 toward the inflatable airbag and away from the vehicle interior, thus locally decreasing the distance between the inner side of the panel and the airbag. This can operate to relocate the natural point of first contact to an altered point of first contact along the rib structure.

Another effect is an efficient transmission of airbag inflation forces to the tear seam 30. Because the rib structure 64 makes the door region more rigid along the tear seam, there is less local distribution of airbag forces there. In other words, unreinforced portions of the door region will tend to absorb airbag energy via bending or flexing of the material (e.g., plastic), which has the additional effect of distributing additionally added force rather than concentrating it. The rib-reinforced portions, on the other hand, more directly transmit local airbag forces to the weakest part of the door region, which is the tear seam 30, thus resulting in a faster response of the tear seam to the airbag forces.

In the illustrated embodiment, each one of the transversely extending ribs 68 has a uniform height along its entire extent between the first and second segments 50, 52 of the tear seam 30. Each one of the longitudinally extending ribs 66, however, has a height that decreases with distance from the corresponding segments 54, 56 of the tear seam 30 in a direction toward the corresponding boundary rib 70, 72 and the corresponding hinge 36, 38. The tapered rib configuration localizes the maximum height H, maximum effective thickness, and maximum stiffness along the tear seam 30 by lessening or omitting their effects away from the tear seam 30.

The above-described vehicle interior panel 10 and tear seam 30 may alternatively or additionally include any technically feasible combination of one or more of the following features. The shape of each door and corresponding portion of the door region are not symmetric about any axis that is perpendicular with a hinge about which the door pivots during airbag deployment. The shape of each door and corresponding portion of the door region are not symmetric about any axis lying in an x-y plane. The shape of each door and corresponding portion of the door region are not rotationally symmetric about any axis normal to the x-y plane. One or more door(s) formed during airbag deployment has a pentagonal (i.e., five-sided) shape. Each segment of the tear seam is rectilinear. The tear seam is not a Y-shaped tear seam. Each hinge about which a door pivots during airbag deployment is parallel with every other hinge. The panel is not configured for use in deployment of a knee airbag. The door region of the panel is configured to form exactly two doors during airbag deployment. The door region of the panel is configured to form exactly one door during airbag deployment. No segment of the tear seam extends in a direction that intersects a hinge about which a door pivots during airbag deployment.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel comprising a tear seam along which the panel is configured to split during airbag deployment, the tear seam comprising:
   a first segment;
   a second segment parallel with the first segment;
   a third segment extending away from a point on the first segment in a first direction that forms a first angle with the first segment; and
   a fourth segment extending away from a point on the second segment in a second direction that forms a second angle with the second segment,
   wherein the second angle is different from the first angle,
   wherein the first direction intersects the second segment, and
   wherein the second direction intersects the first segment.

2. The vehicle interior panel of claim 1, wherein the third segment and the fourth segment intersect.

3. The vehicle interior panel of claim 1, wherein an end of the third segment and an end of the fourth segment are located in a central section of a door region that includes the tear seam, wherein the central section is centered between the first segment and the second segment and has a width that is 50% or less of a distance between the first segment and the second segment.

4. The vehicle interior panel of claim 3, wherein the third segment and the fourth segment intersect in the central section.

5. The vehicle interior panel of claim 4, wherein the width of the central section is 10% or less of said distance.

6. The vehicle interior panel of claim 1, wherein a difference between the first angle and the second angle is in a range from 5 degrees to 30 degrees.

7. The vehicle interior panel of claim 1, wherein: a door is formed from the panel when the panel splits along the tear seam during airbag deployment, the door pivots about a hinge, and the third segment is parallel with the hinge.

8. The vehicle interior panel of claim 1, wherein a first door and a second door are formed from the panel when the panel splits along the tear seam during airbag deployment, an area of the first door being larger than an area of the second door.

9. The vehicle interior panel of claim 1, wherein: a first door and a second door are formed from the panel when the panel splits along the tear seam during airbag deployment, the first door pivots about a first hinge, the second door pivots about a second hinge, and a distance between the third segment and the first hinge is greater than 60% of a distance between the first hinge and the second hinge.

10. The vehicle interior panel of claim 1, wherein the vehicle interior panel is an instrument panel, and the tear seam is on a passenger side of a vehicle when the panel is installed in the vehicle.

11. The vehicle interior panel of claim 10, wherein: a first door and a second door are formed from the panel when the panel splits along the tear seam during airbag deployment, a larger of the first door and the second door pivots toward a windshield of the vehicle, and a smaller of the first door and the second door pivots away from the windshield.

12. The vehicle interior panel of claim 10, wherein a first door and a second door are formed from the panel when the panel splits along the tear seam during airbag deployment, and the first door provides clearance with an A-pillar of the vehicle.

13. The vehicle interior panel of claim 1, further comprising a rib structure extending along an inner side of the panel and adjacent to the third segment or the fourth segment of the tear seam such that a door region of the panel has a maximum stiffness along the tear seam.

14. The vehicle interior panel of claim 13, wherein a maximum height of the rib structure is along the third segment or the fourth segment of the tear seam.

15. The vehicle interior panel of claim 13, wherein the rib structure comprises a plurality of ribs extending away from the third segment or the fourth segment and parallel with the first segment and the second segment, each rib having a height that decreases with a distance from the third segment or the fourth segment of the tear seam.

16. A vehicle interior panel comprising a tear seam along which the panel is configured to split during airbag deployment, wherein a door is formed from the panel when the panel splits and the door pivots about a hinge, the tear seam comprising:
a first segment;
a second segment parallel with the first segment;
a third segment extending from the first segment toward the second segment and forming a first angle with the first segment,
wherein the third segment is parallel with the hinge; and
a fourth segment extending from the second segment toward the first segment and forming a second angle with the second segment,
wherein the second angle is different from the first angle.

17. The vehicle interior panel of claim 16, wherein the third segment and the fourth segment intersect.

18. The vehicle interior panel of claim 16, wherein an end of the third segment and an end of the fourth segment are located in a central section of a door region that includes the tear seam, wherein the central section is centered between the first segment and the second segment and has a width that is 50% or less of a distance between the first segment and the second segment.

19. The vehicle interior panel of claim 16, further comprising a rib structure extending along an inner side of the panel and adjacent to the third segment or the fourth segment of the tear seam such that a door region of the panel has a maximum stiffness along the tear seam.

20. The vehicle interior panel of claim 1, wherein the third segment and the fourth segment intersect at a non-tangent point.

* * * * *